(12) United States Patent
Yee et al.

(10) Patent No.: US 12,166,750 B2
(45) Date of Patent: Dec. 10, 2024

(54) SYSTEMS AND METHODS FOR SECURE ACCESS OF STORAGE

(71) Applicant: Capital One Services, LLC, McLean, VA (US)

(72) Inventors: Bryant Yee, Washington, DC (US); Mykhaylo Bulgakov, Arlington, VA (US); George Bergeron, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 132 days.

(21) Appl. No.: 17/667,417

(22) Filed: Feb. 8, 2022

(65) Prior Publication Data
US 2023/0254304 A1 Aug. 10, 2023

(51) Int. Cl.
*H04L 9/40* (2022.01)

(52) U.S. Cl.
CPC .......... *H04L 63/083* (2013.01); *H04L 63/102* (2013.01); *H04L 63/104* (2013.01); *H04L 63/20* (2013.01)

(58) Field of Classification Search
CPC .............. H04L 63/083; H04L 63/102; H04L 63/104; H04L 63/20; H04L 63/0861; H04L 63/0876; H04L 2463/082; H04L 63/0853; G06F 21/40; G06F 21/604; G06F 21/34; G06F 21/32
See application file for complete search history.

(56) References Cited

U.S. PATENT DOCUMENTS

| 4,683,553 A | 7/1987 | Mollier |
| 4,827,113 A | 5/1989 | Rikuna |
| 4,910,773 A | 3/1990 | Hazard et al. |

(Continued)

FOREIGN PATENT DOCUMENTS

| CA | 3010336 | 7/2017 |
| CN | 101192295 | 6/2008 |

(Continued)

OTHER PUBLICATIONS

Dutta et al.; "Microcontroller Based Bank Locker Security System Using Iris Scanner and Vein Scanner", 2018, Proceedings of the International Conference on Inventive Research in Computing Applications, IEEE Xplore, pp. 53-57. (Year: 2018).*

(Continued)

*Primary Examiner* — Matthew Smithers
(74) *Attorney, Agent, or Firm* — KDW Firm PLLC; Andrew D. Kasnevich

(57) ABSTRACT

Systems and methods for secure access are provided. The secure access system includes a contactless card, a user device, a processor, and a storage device. The processor receives a first authentication request from the user device. Then, the processor transmits a first authentication credential associated with user login data to the user device. Next, the processor receives a second authentication request from the user device. Upon receipt of the second authentication request, the processor transmits a second authentication credential associated with a contactless card to the user device. Then, the processor receives a first code from the user device, and the storage device performs one or more access actions based on the first code.

20 Claims, 9 Drawing Sheets

(56) References Cited

U.S. PATENT DOCUMENTS

| | | | |
|---|---|---|---|
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |
| 5,666,415 A | 9/1997 | Kaufman | |
| 5,764,789 A | 6/1998 | Pare, Jr. et al. | |
| 5,768,373 A | 6/1998 | Lohstroh et al. | |
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,929,413 A | 7/1999 | Gardner | |
| 5,960,411 A | 9/1999 | Hartman et al. | |
| 6,021,203 A | 2/2000 | Douceur et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,601,040 B1 * | 7/2003 | Kolls | G06Q 30/0601 |
| | | | 705/26.1 |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,731,778 B1 | 5/2004 | Oda et al. | |
| 6,779,115 B1 | 8/2004 | Naim | |
| 6,792,533 B2 | 9/2004 | Jablon | |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,868,441 B2 | 3/2005 | Greene et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,353,396 B2 | 4/2008 | Micali et al. | |
| 7,357,312 B2 | 4/2008 | Gangi | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,552,467 B2 * | 6/2009 | Lindsay | G07F 7/1025 |
| | | | 713/168 |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Holtmanns et al. | |
| 7,652,578 B2 | 1/2010 | Braun et al. | |
| 7,676,438 B2 | 3/2010 | Brewer et al. | |
| 7,689,832 B2 | 3/2010 | Talmor et al. | |
| 7,703,142 B1 | 4/2010 | Wilson et al. | |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,900,048 B2 | 3/2011 | Andersson | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,993,197 B2 | 8/2011 | Mamdani et al. | |
| 8,005,426 B2 | 8/2011 | Huomo et al. | |
| 8,010,405 B1 | 8/2011 | Bortolin et al. | |
| RE42,762 E | 9/2011 | Shin | |
| 8,041,954 B2 | 10/2011 | Plesman | |
| 8,056,802 B2 | 11/2011 | Gressel et al. | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,103,249 B2 | 1/2012 | Markison | |
| 8,108,687 B2 | 1/2012 | Ellis et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,171,524 B2 | 5/2012 | Micali et al. | |
| 8,186,602 B2 | 5/2012 | Itay et al. | |
| 8,196,131 B1 | 6/2012 | von Behren et al. | |
| 8,213,902 B2 | 7/2012 | Rowley | |
| 8,215,563 B2 | 7/2012 | Levy et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,245,292 B2 | 8/2012 | Buer | |
| 8,249,654 B1 | 8/2012 | Zhu | |
| 8,266,451 B2 | 9/2012 | Leydier et al. | |
| 8,285,329 B1 | 10/2012 | Zhu | |
| 8,300,914 B2 | 10/2012 | Ueda | |
| 8,302,872 B2 | 11/2012 | Mullen | |
| 8,312,519 B1 | 11/2012 | Bailey et al. | |

(56) References Cited

U.S. PATENT DOCUMENTS

| | | |
|---|---|---|
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,464,936 B2 | 6/2013 | Zeigler |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,881,252 B2 * | 11/2014 | Van Till .............. H04L 63/0853 726/19 |
| 8,888,002 B2 | 11/2014 | Chesney et al. |
| 8,898,088 B2 | 11/2014 | Springer et al. |
| 8,934,837 B2 | 1/2015 | Zhu et al. |
| 8,959,034 B2 | 2/2015 | Jiang et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,020,858 B2 | 4/2015 | Jiang et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,230,375 B2 | 1/2016 | Micali et al. |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,516,487 B2 | 12/2016 | Powell et al. |
| 9,553,637 B2 | 1/2017 | Yang et al. |
| 9,576,159 B1 | 2/2017 | Templeton et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,916,581 B2 | 3/2018 | Dorsey et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,074,068 B2 * | 9/2018 | Irwin .................... G07F 9/001 |
| 10,075,437 B1 | 9/2018 | Costigan et al. |
| 10,109,124 B2 * | 10/2018 | Gilbertson .............. G06F 21/32 |
| 10,129,648 B1 | 11/2018 | Hernandez et al. |
| 10,133,979 B1 | 11/2018 | Eidam et al. |
| 10,169,626 B2 | 1/2019 | Britt et al. |
| 10,192,214 B2 | 1/2019 | Jiang et al. |
| 10,217,105 B1 | 2/2019 | Sangi et al. |
| 10,362,114 B2 | 7/2019 | Britt |
| 10,447,784 B2 | 10/2019 | Britt |
| 10,524,119 B2 | 12/2019 | Altin et al. |
| 10,587,400 B2 | 3/2020 | Zimmerman et al. |
| 10,658,514 B2 * | 5/2020 | Campi, Jr. ........... B29C 37/0025 |
| 10,783,486 B2 * | 9/2020 | Irwin .................... G06Q 10/0837 |
| 10,991,240 B2 * | 4/2021 | Davis ................... G06F 1/3287 |
| 11,151,816 B2 * | 10/2021 | Schoenfelder ......... G07C 9/257 |
| 11,216,827 B2 * | 1/2022 | Budano .................. G07C 9/33 |
| 11,341,502 B1 * | 5/2022 | Hill ...................... G06Q 20/381 |
| 11,568,695 B1 * | 1/2023 | Kocher .................. H04L 9/321 |
| 11,575,671 B2 * | 2/2023 | Manepalli ............. H04W 12/06 |
| 11,620,866 B1 * | 4/2023 | Goetz ................ G07C 9/00912 705/44 |
| 11,736,468 B2 * | 8/2023 | Lowe .................... G06F 21/35 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0034719 A1 | 10/2001 | Durand et al. |
| 2001/0054003 A1 | 12/2001 | Chien et al. |
| 2002/0078345 A1 | 6/2002 | Sandhu et al. |
| 2002/0080030 A1 * | 6/2002 | Inomata .............. G07F 17/0014 340/542 |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0135469 A1 | 7/2003 | Chung |
| 2003/0167350 A1 | 9/2003 | Davis et al. |
| 2003/0204732 A1 | 10/2003 | Audebert et al. |
| 2003/0208449 A1 | 11/2003 | Diao |

(56) References Cited

U.S. PATENT DOCUMENTS

| | | |
|---|---|---|
| 2004/0015958 A1 | 1/2004 | Veil et al. |
| 2004/0039919 A1 | 2/2004 | Takayama et al. |
| 2004/0039920 A1* | 2/2004 | Kim .................. G07C 9/0069 713/185 |
| 2004/0093496 A1 | 5/2004 | Colnot |
| 2004/0127256 A1 | 7/2004 | Goldthwaite et al. |
| 2004/0133304 A1* | 7/2004 | Fobbe .................. G07C 9/33 700/214 |
| 2004/0215674 A1 | 10/2004 | Odinak et al. |
| 2004/0230799 A1 | 11/2004 | Davis |
| 2004/0263315 A1* | 12/2004 | Kim .................. G07C 9/257 340/5.7 |
| 2005/0035200 A1 | 2/2005 | Hendrick |
| 2005/0044367 A1 | 2/2005 | Gasparini et al. |
| 2005/0060586 A1 | 3/2005 | Burger et al. |
| 2005/0068178 A1 | 3/2005 | Lee et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2005/0268107 A1* | 12/2005 | Harris .................. H04L 63/0853 713/182 |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0215698 A1 | 9/2007 | Perry |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0059379 A1 | 3/2008 | Ramaci et al. |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0212909 A1 | 8/2009 | Burger et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0057620 A1 | 3/2010 | Li et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0042456 A1 | 2/2011 | Masaryk et al. |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0011070 A1 | 1/2012 | Ward et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2012/0330787 A1 | 12/2012 | Hanson et al. |
| 2012/0330788 A1 | 12/2012 | Hanson et al. |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |

(56) References Cited

U.S. PATENT DOCUMENTS

| | | |
|---|---|---|
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0173405 A1 | 7/2013 | Gouessant |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0264386 A1 | 10/2013 | Greenspan |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0317986 A1* | 11/2013 | Tucker ............... G06Q 20/1085 |
| | | 109/23 |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0035721 A1* | 2/2014 | Heppe ............... G07C 9/00309 |
| | | 340/5.54 |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0282993 A1* | 9/2014 | Van Till ............... G07C 9/27 |
| | | 726/9 |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0019442 A1 | 1/2015 | Hird et al. |
| 2015/0032635 A1 | 1/2015 | Guise |
| 2015/0067793 A1* | 3/2015 | Robison, Jr. ........ H04L 63/083 |
| | | 726/5 |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0287031 A1 | 10/2015 | Radu et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0356801 A1 | 12/2015 | Nitu et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0066732 A1 | 3/2016 | Sarvestani |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0335822 A1 | 11/2016 | Ogishi et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017819 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0103647 A1* | 4/2017 | Davis .................. H04W 12/068 |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0221047 A1 | 8/2017 | Veerasangappa Kadi et al. |
| 2017/0230189 A1 | 8/2017 | Toll et al. |
| 2017/0237301 A1 | 8/2017 | Elad et al. |
| 2017/0249451 A1* | 8/2017 | Andreeva ............. G06V 40/18 |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0005238 A1 | 1/2018 | Hammad et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0262891 A1* | 9/2018 | Wu ..................... H04W 12/065 |
| 2018/0268132 A1 | 9/2018 | Buer et al. |
| 2018/0270214 A1 | 9/2018 | Caterino et al. |
| 2018/0294959 A1 | 10/2018 | Traynor et al. |

(56) References Cited

U.S. PATENT DOCUMENTS

| | | | |
|---|---|---|---|
| 2018/0300716 | A1 | 10/2018 | Carlson |
| 2018/0302396 | A1 | 10/2018 | Camenisch et al. |
| 2018/0315050 | A1 | 11/2018 | Hammad |
| 2018/0316666 | A1 | 11/2018 | Koved et al. |
| 2018/0322486 | A1 | 11/2018 | Deliwala et al. |
| 2018/0359100 | A1 | 12/2018 | Gaddam et al. |
| 2018/0375659 | A1* | 12/2018 | Kozma ............... H04L 63/083 |
| 2019/0014107 | A1 | 1/2019 | George |
| 2019/0019375 | A1 | 1/2019 | Foley |
| 2019/0036678 | A1 | 1/2019 | Ahmed |
| 2019/0147554 | A1* | 5/2019 | Chintala ............ G06F 21/6245 |
| | | | 705/311 |
| 2019/0238517 | A1 | 8/2019 | D'Agostino et al. |
| 2020/0104826 | A1* | 4/2020 | Rule ............... G06K 19/07309 |
| 2020/0104891 | A1* | 4/2020 | Rule ..................... H04W 12/06 |
| 2020/0286085 | A1 | 9/2020 | Mestre et al. |
| 2020/0322800 | A1* | 10/2020 | Ozanian ................ H04W 12/08 |
| 2021/0035063 | A1* | 2/2021 | Cartwright .............. G07F 9/026 |
| 2021/0084021 | A1* | 3/2021 | Gibson ............... H04L 63/0807 |
| 2021/0134421 | A1* | 5/2021 | Mousseau ............. G16H 15/00 |
| 2021/0176062 | A1 | 6/2021 | Chitalia et al. |
| 2021/0266737 | A1* | 8/2021 | Burke ............... G06F 16/24553 |
| 2021/0297412 | A1* | 9/2021 | Thayyilsubramanian ................... |
| | | | G06Q 20/4014 |
| 2021/0304862 | A1* | 9/2021 | Moreno ................ G16H 40/67 |
| 2021/0385248 | A1* | 12/2021 | Ilincic ................ H04M 3/5175 |
| 2022/0217306 | A1* | 7/2022 | Ratnakaram ........... G01G 19/52 |
| 2023/0115246 | A1* | 4/2023 | Budman ................ H04L 63/08 |
| | | | 726/4 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| EP | 3 070 632 | 9/2016 |
| GB | 2 457 221 | 8/2009 |
| GB | 2 516 861 | 2/2015 |
| GB | 2 543 612 | 4/2017 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018037392 | 3/2018 |
| WO | WO 2018063809 | 4/2018 |
| WO | WO 2018096559 | 5/2018 |
| WO | WO 2018137888 | 8/2018 |

OTHER PUBLICATIONS

International Search Report and the Written Opinion of the International Searching Authority issued in related PCT Application No. PCT/US2023/012335 mailed May 19, 2023, 14 pages.

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-US/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

(56) References Cited

OTHER PUBLICATIONS

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon. com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, Mobicom. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

SmartCard Alliance, Technologies for Payment Fraud Prevention: EMV, Encryption and Tokenization, Pub. No. PC-14002 (Oct. 2014), 34 pages.

Danushka et al., "Enhancing EMV Tokenisation with Dynamic Transaction Tokens", International Workshop on Radio Frequency Identification: Security and Privacy Issues, Springer, Cham, 2016.

Fillmore, Peter, "Mobile and Contactless Payment Security", v20111118, Witham Laboratories, (2011): 1-39 (Year: 2011).

* cited by examiner

System 100

Method 300B

Sequence 600

SYSTEMS AND METHODS FOR SECURE ACCESS OF STORAGE

FIELD OF THE DISCLOSURE

The present disclosure relates to systems and methods for secure access of storage.

BACKGROUND

Electronic commerce is becoming increasingly widespread and common. Likewise, online shopping, where items are purchased online and shipped to the purchasing customer at a residential address, commercial address, or other location, constitutes a growing part of the global economy. In tandem with the rise of online shopping has been the use of storage devices to house packages that the purchasing customer can retrieve at a later time. Secure, authentication-locked containers are common methods of storing valuables. These methods are frequently used to store important documents or packages in a secure housing. Packages, documents, or other valuable items are becoming increasingly common among consumers of online commerce.

The demand for secure containers is increasing, and accordingly there is an increasing need for secure methods to access these containers. Storing valuable items inside of a locked container presents a number of safety concerns, such as unauthorized access. For example, if a container is not properly stored or its security is too weak, then valuable items are at risk of being stolen or lost. As another example, containers located in public spaces such as lobbies or off-site facilities are at risk of being stolen or tampered with by unauthorized parties. As another example, containers located in private spaces such as medicine cabinets or safes are at risk of being accessed by children or other unauthorized parties.

These and other deficiencies exist. Therefore, there is a need to provide systems and methods that overcome these deficiencies to verify customers in a secure and efficient manner.

SUMMARY OF THE DISCLOSURE

Aspects of the disclosed technology include systems and methods for secure access of storage.

Embodiments of the present disclosure provide a secure access system. The secure access system includes a storage device, a user device, and a card. The storage device includes a memory and a processor. The processor is configured to receive a first authentication request from the user device. After the first authentication request has been received, the processor is configured to transmit a first authentication credential associated with user login data to the user device. Upon receipt of the first authentication credential, the processor is configured to receive a second authentication request from the user device. In response to the second authentication request, the processor is configured to transmit a second authentication credential associated with an entry of a card into a communication field to the user device. Upon receipt of the second authentication credential, the user device is configured to send a first code to the processor. Upon receipt of the first code, the processor is configured to perform one or more actions based on the first code.

Embodiments of the present disclosure provide a method of a secure access system. The method of a secure access system comprises: receiving a first authentication request; transmitting a first authentication credential; receiving a second authentication request; transmitting a second authentication credential; receiving a first code; and performing one or more access actions based on the first code.

Embodiments of the present disclosure provide a non-transitory medium comprising computer executable instructions. The computer executable instructions perform procedures comprising the steps of: receiving a first authentication request; transmitting a first authentication credential; receiving a second authentication request; transmitting a second authentication credential; receiving a first code; and performing one or more access actions based on the first code.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

Various embodiments of the present disclosure, together with further objects and advantages, may best be understood by reference to the following description taken in conjunction with the accompanying drawings. The drawings should not be construed as limiting the present invention, but are intended only to illustrate different aspects and embodiments of the invention.

DETAILED DESCRIPTION

Figure 1:
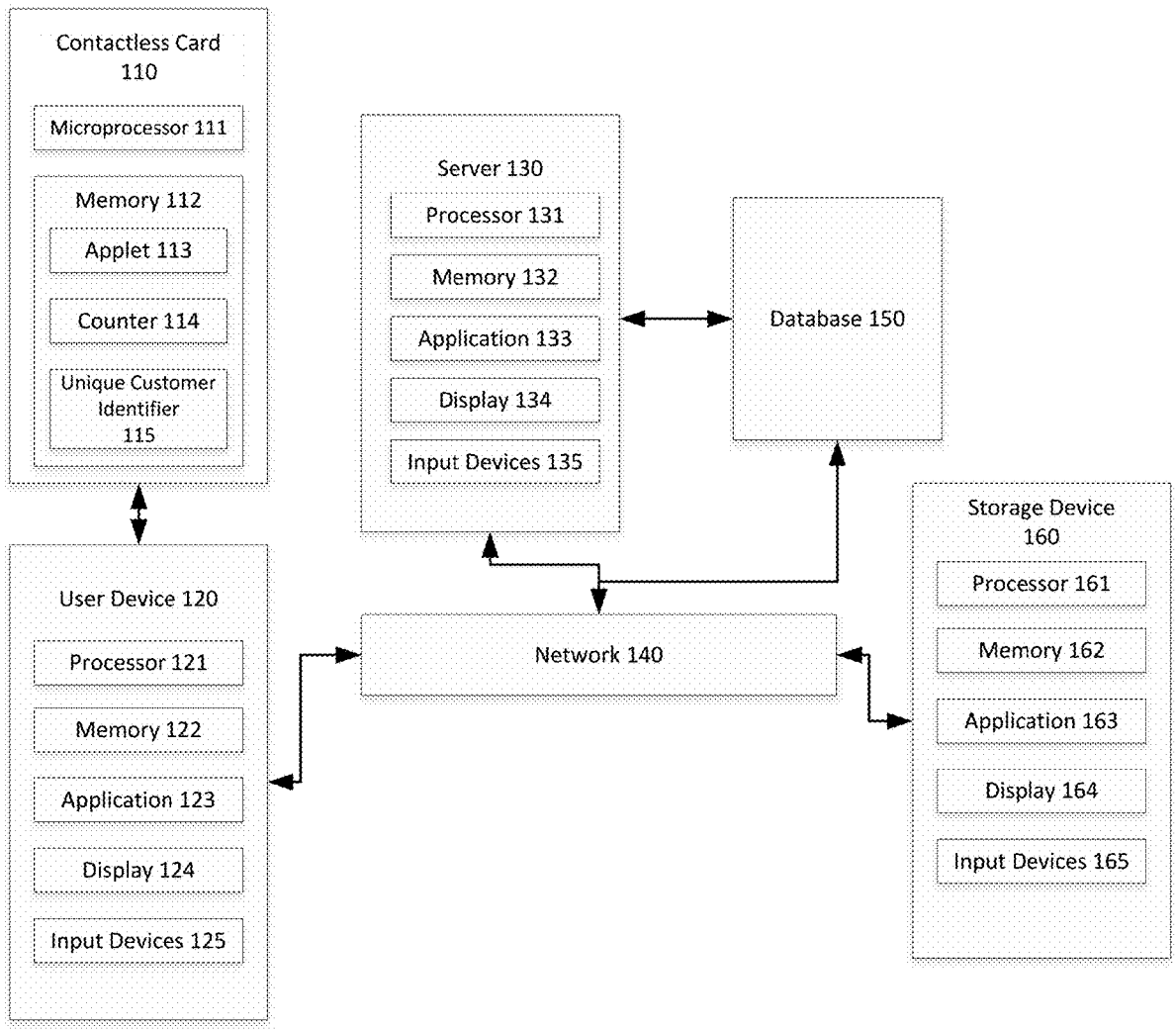
FIG. 1 is a diagram of a system for a secure access system according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present disclosure provides systems and methods for a secure access system.

Benefits of the systems and methods disclosed herein include improved security and efficient access of storage.

Example embodiments of the present disclosure provide systems and methods for a secure access system. A contactless card or other device may be tapped to a device (e.g., a smart phone) to engage with the secure access system and method. Accordingly, a delivery person can verify that they are delivering a package to the right person, and the person accepting the package can also verify that the delivery person who is delivering to them is authorized to make the delivery.

In some embodiments, when a contactless card or other device is tapped to a person's phone, certificates signed by an employer (e.g., a courier) can also be transferred. This transfer can be either directly from the contactless card, the person's phone, or indirectly after looking up their identity online.

In some embodiments, when a contactless card is tapped to a package delivery device, the identity of the person who taps the contactless card can be determined and verified to match the addressee of the package. This can also be implemented with host card emulation (HCE) that emulates the contactless card. The address on the package may be a loose address (stored preferences) or tight with digitally signed certificates, or may be scoped to the individual delivery transaction.

Example embodiments of the present disclosure can promote the efficiency and security of transactions, such as package pickup and delivery transactions and the purchase of goods or services subject to age restrictions, quantity restrictions, and other restrictions. Further, the identity verification can be carried out quickly, without degrading the user experience and without the need for consumers, employees, and other personnel to carry identification documents and other materials. It is understood that example embodiments of the present disclosure are applicable to a wide range of purposes where identity verification is required, including, without limitation, package pickup, package delivery, security (e.g., building or restricted area access), and travel (e.g., ticket purchases, plane or train boarding).

Example embodiments of the present disclosure can promote the safety and privacy of the user, such securing the access to safes or medicine cabinets or other storage containers located in a user's private home. The verifications required by the present disclosure secure storage devices from unauthorized parties.

FIG. 1 illustrates a system 100 according to an example embodiment. The system 100 may comprise a contactless card 110, a user device 120, a server 130, a network 140, a database 150, and a storage device 160. Although FIG. 1 illustrates single instances of components of system 100, system 100 may include any number of components.

System 100 may include one or more contactless cards 110 which are further explained below with reference to FIGS. 2A-2B. In some embodiments, contactless card 110 may be in wireless communication, utilizing NFC in an example, with user device 120.

System 100 may include a user device 120. The user device 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 120 may include a processor 121, a memory 122, and an application 123. The processor 121 may be a processor, a microprocessor, or other processor, and the user device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the user device 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's private data and financial account information.

The application 123 may comprise one or more software applications, such as a mobile application and a web browser, comprising instructions for execution on the user device 120. In some examples, the user device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the user device 120 that is available and supported by the user device 120, such as a touch-screen, keyboard, mouse, cursor-control device, touch-screen, microphone, digital camera, video recorder or camcorder. These devices may be used to enter information and interact with the software and other devices described herein.

System 100 may include a server 130. The server 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 132 may be configured to store one or more software applications, such as the application 133, and other data, such as user's private data and financial account information.

The application 133 may comprise one or more software applications comprising instructions for execution on the server 130. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. For example, the application 133 may be executed to perform receiving web form data from the user device 120 and the storage device 160, retaining a web session between the user device 120 and the storage device 160, and masking private data received from the user device 120 and the storage device 160. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, touch-screen, microphone, digital camera, video recorder or camcorder. These devices may be used to enter information and interact with the software and other devices described herein.

System 100 may include one or more networks 140. In some examples, the network 140 may be one or more of a wireless network, a wired network or any combination of wireless network and wired network, and may be configured to connect the user device 120, the server 130, the database 150 and the storage device 160. For example, the network 140 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 140 may include, without limitation, telephone lines, fiber optics, IEEE Ethernet 902.3, a wide area network, a wireless personal area network, a LAN, or a global network such as the Internet. In addition, the network 140 may support an Internet network, a wireless communication network, a cellular network, or the like, or any combination thereof. The network 140 may further include one network, or any number of the exemplary types of networks mentioned above, operating as a stand-alone network or in cooperation with each other. The network 140 may utilize one or more protocols of one or more network elements to which they are communicatively coupled. The network 140 may translate to or from other protocols to one or more protocols of network devices. Although the network 140 is depicted as a single network, it should be appreciated that according to one or more examples, the network 140 may comprise a plurality of interconnected networks, such as, for example, the Internet, a service provider's network, a cable television network, corporate networks, such as credit card association networks, and home networks. The network 140 may further comprise, or be configured to create, one or more front channels, which may be publicly accessible and through which communications may be observable, and one or more secured back channels, which may not be publicly accessible and through which communications may not be observable.

System 100 may include a database 150. The database 150 may be one or more databases configured to store data, including without limitation, private data of users, financial accounts of users, identities of users, transactions of users, and certified and uncertified documents. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 may be hosted internally by the server 130 or may be hosted externally of the server 130, such as by a server, by a cloud-based platform, or in any storage device that is in data communication with the server 130.

System 100 may include a storage device 160. The storage device 160 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The storage device 160 may include a processor 161, a memory 162, and an application 163. The processor 161 may be a processor, a microprocessor, or other processor, and the storage device 160 may include one or more of these processors. The processor 161 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 161 may be coupled to the memory 162. The memory 162 may be a read-only memory, write-once read-multiple memory or read/write memory, e.g., RAM, ROM, and EEPROM, and the storage device 160 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 162 may be configured to store one or more software applications, such as the application 163, and other data, such as user's private data and financial account information.

The application 163 may comprise one or more software applications comprising instructions for execution on the storage device 160. In some examples, the storage device 160 may execute one or more applications, such as software applications, that enable, for example, network communications with one or more components of the system 100, transmit and/or receive data, and perform the functions described herein. Upon execution by the processor 161, the application 163 may provide the functions described in this specification, specifically to execute and perform the steps and functions in the process flows described below. For example, the application 163 may be executed to perform receiving web form data from the user device 120 and the storage device 160, retaining a web session between the user device 120 and the storage device 160, and masking private data received from the user device 120 and the storage device 160. Such processes may be implemented in software, such as software modules, for execution by computers or other machines. The application 163 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The storage device 160 may further include a display 164 and input devices 165. The display 164 may be any type of device for presenting visual information such as a computer monitor, a flat panel display, and a mobile device screen, including liquid crystal displays, light-emitting diode displays, plasma panels, and cathode ray tube displays. The input devices 165 may include any device for entering information into the server 130 that is available and supported by the server 130, such as a touch-screen, keyboard, mouse, cursor-control device, touch-screen, microphone, digital camera, video recorder or camcorder. These devices may be used to enter information and interact with the software and other devices described herein.

Figure 2A:
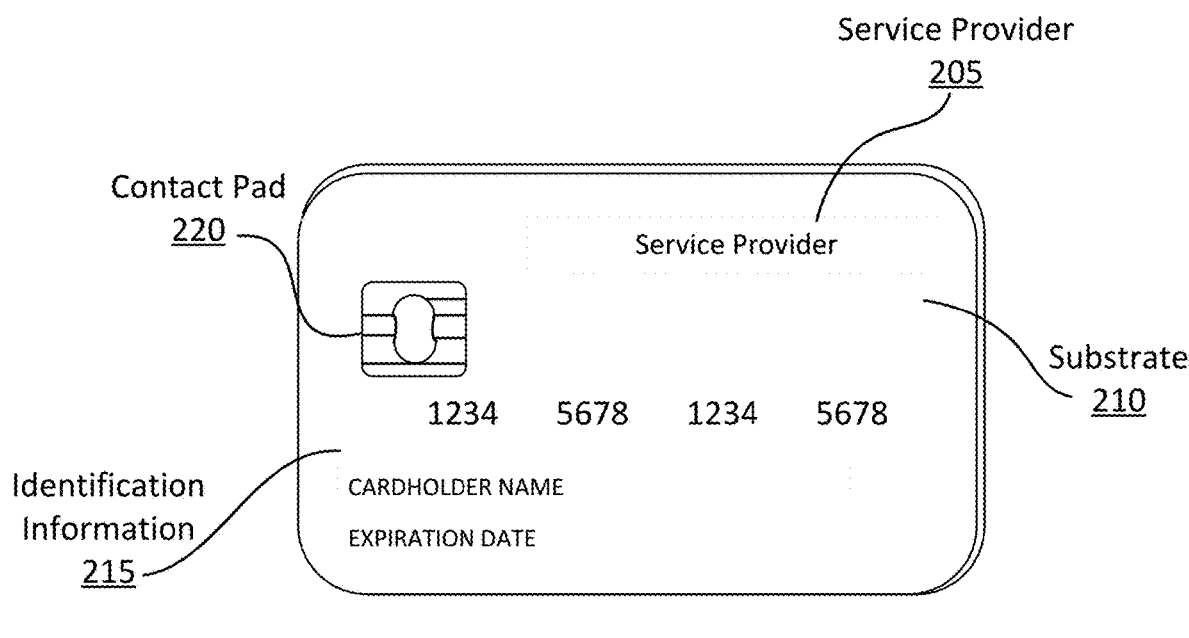
FIG. 2A is a diagram of a contactless card according to an example embodiment.

FIG. 2A illustrates a contactless card 110 according to an example embodiment. The contactless card 110 may comprise a payment card, such as a credit card, debit card, or gift card, issued by a service provider 205 displayed on the front or back of the card 110. In some examples, the contactless card 110 is not related to a payment card, and may comprise, without limitation, an identification card, a membership card, a transportation card, or an access card. In some examples, the payment card may comprise a dual interface contactless payment card.

The contactless card 110 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200A may have physical characteristics compliant with the ID-1 format of the ISO/IEC 7810 standard, and the contactless card may otherwise be compliant with the ISO/IEC 14443 standard. However, it is understood that the contactless card 110 according to the present disclosure may have different characteristics, and the present disclosure does not require a contactless card to be implemented in a payment card.

The contactless card 110 may also include identification information 215 displayed on the front and/or back of the card, and a contact pad 220. The contact pad 220 may be configured to establish contact with another communication device, such as a user device, smart phone, laptop, desktop, or tablet computer. The contactless card 110 may also include processing circuitry, antenna and other components not shown in FIG. 2A. These components may be located behind the contact pad 220 or elsewhere on the substrate 210. The contactless card 110 may also include a magnetic strip or tape, which may be located on the back of the card (not shown in FIG. 2A).

Figure 2B:
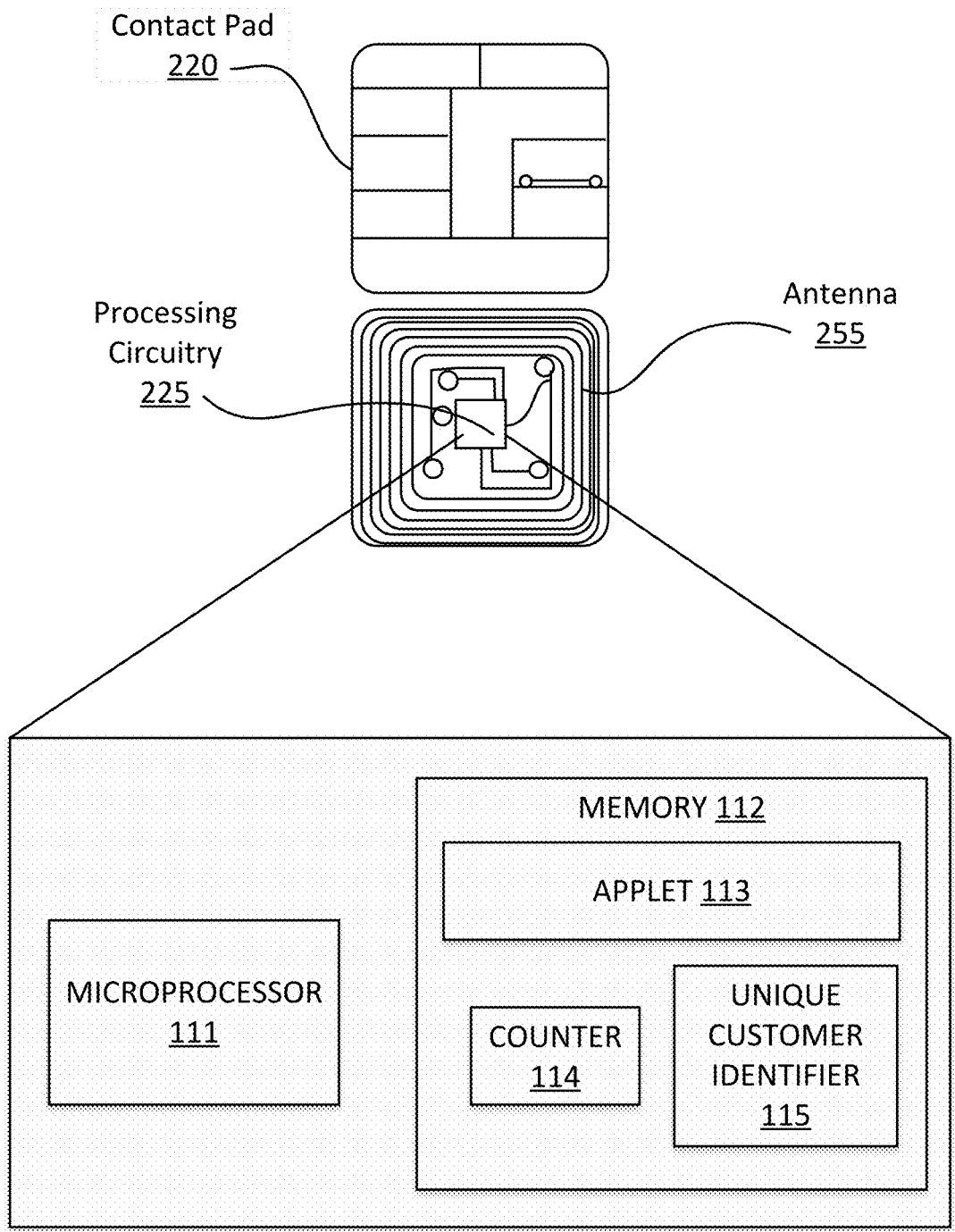
FIG. 2B is a diagram of a contactless card according to an example embodiment.

FIG. 2B illustrates a contactless card 110 according to an example embodiment.

As illustrated in FIG. 2B, the contact pad 220 may include processing circuitry 225 for storing and processing information, including a microprocessor 111 and a memory 112. It is understood that the processing circuitry 225 may contain additional components, including processors, memories, error and parity/CRC checkers, data encoders, anticollision algorithms, controllers, command decoders, security primitives and tamperproofing hardware, as necessary to perform the functions described herein.

The memory 112 may be a read-only memory, write-once read-multiple memory or read/write memory, e.g., RAM, ROM, and EEPROM, and the contactless card 200B may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 112 may be configured to store one or more applets 113, one or more counters 114, and a customer identifier 115. The one or more applets 113 may comprise one or more software applications configured to execute on one or more contactless cards, such as Java Card applet. However, it is understood that applets 113 are not limited to Java Card applets, and instead may be any software application operable on contactless cards or other devices having limited memory. The one or more counters 114 may comprise a numeric counter sufficient to store an integer. The customer identifier 115 may comprise a unique alphanumeric identifier assigned to a user of the contactless card 110, and the identifier may distinguish the user of the contactless card from other contactless card users. In some examples, the customer identifier 115 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to processor 111 and memory 112 elements located within the contact pad 220.

In some examples, the contactless card 110 may comprise one or more antennas 255. The one or more antennas 255 may be placed within the contactless card 110 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 110 may act as the secondary of an air core transformer. The terminal may communicate with the contactless card 110 by cutting power or amplitude modulation. The contactless card 110 may infer the data transmitted from the terminal using the gaps in the contactless card's power connection, which may be functionally maintained through one or more capacitors. The contactless card 110 may communicate back by switching a load on the contactless card's coil or load modulation. Load modulation may be detected in the terminal's coil through interference.

As explained above, the contactless card 110 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 3A:
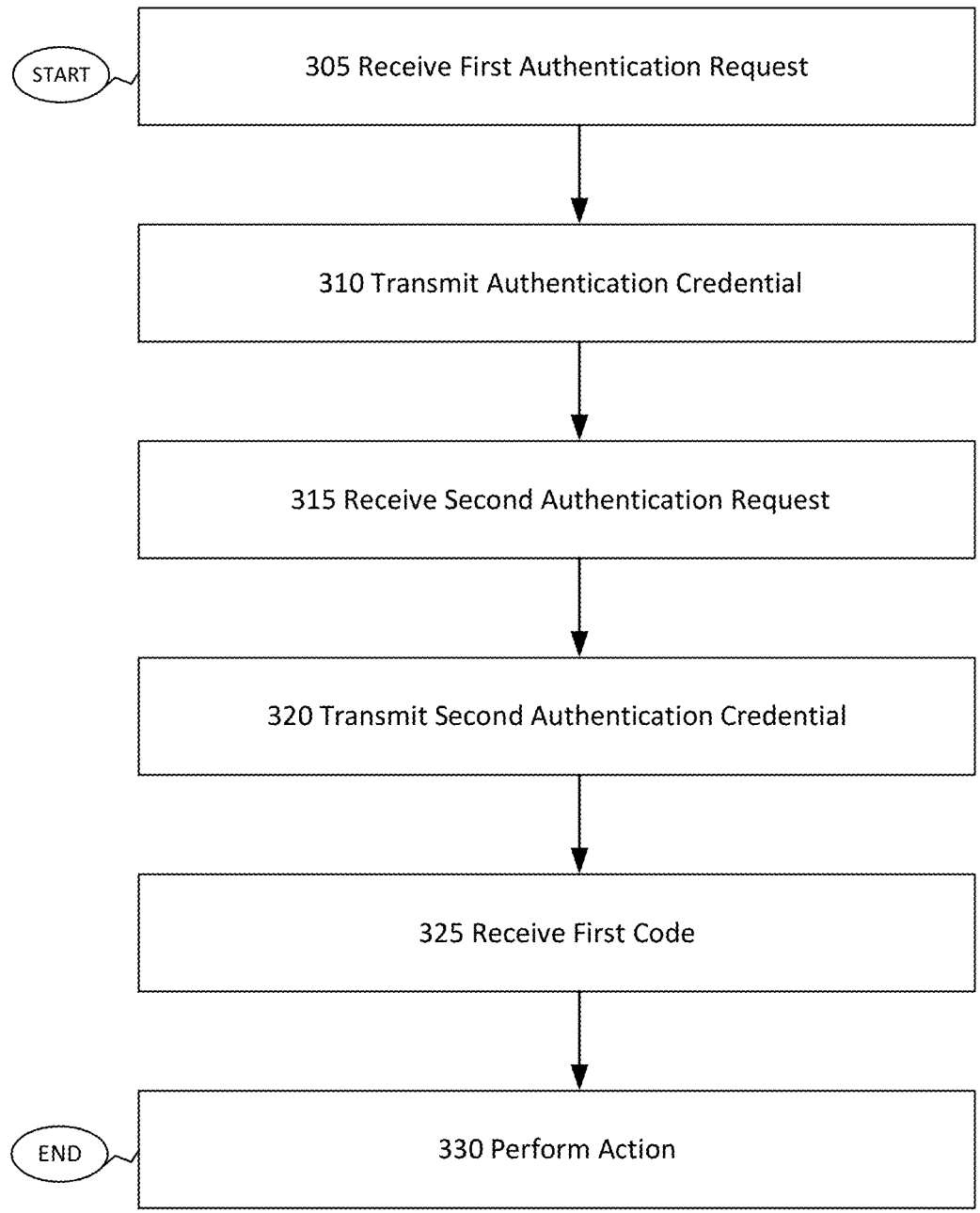
FIG. 3A is a flow chart illustrating a method of secure access according to an example embodiment.

FIG. 3A is a flow chart of method 300A of secure access according to an example of the present disclosure. FIG. 3 can reference the same or similar components as illustrated in FIGS. 1-2.

The method 300A can commence in step 305 where the first authentication request is received. The first authentication request may be transmitted by a user device and may be received by a processor. The processor may be related to the storage device, a server, or another device.

In step 310, the first authentication credential is transmitted to the user device. The first authentication credential may be transmitted by a processor. The processor may be related to the storage device, a server, or another device.

In step 315, the second authentication request is received by the processor. The processor may be related to the storage device, a server, or another device.

In step 320, the second authentication credential is transmitted to the user device. The second authentication credential may be transmitted by a processor. The processor may be related to the storage device, a server, or another device.

The processor may attempt transmission of the first and second authentication credentials up to a predetermined threshold number. For example, the processor may attempt to send the first authentication credential up to a threshold of five attempts if the first four attempts are not satisfied. It is understood that five is an example threshold, and that the processor may attempt transmission five times, less than five times, or more than five times.

The processor may delay the performance of one or more access actions if the attempted transmission of the first and second authentication credentials exceed the predetermined threshold.

The processor may attempt to transmit a third authentication request and to receive, in response to the third authentication request, a third authentication credential associated with biometric data. This biometric data can include one or more predetermined kinds of data including but not limited to voice recognition, fingerprint scanning, handprint scanning, hand-geometry recognition, ear shape recognition, vein pattern recognition, facial recognition, iris recognition, retina recognition, heart-rate recognition, body temperature recognition, and DNA recognition.

In step 325, the first code is received by the processor. The processor may be related to the storage device or some other server. The processor may receive a second code if the first code is not received and inputted within a predetermined time period.

In step 330, the action related to the first code is performed. The action may be performed by the storage device. One or more of the access actions can include opening a safe, closing a safe, unlocking a safe, and locking a safe. As another example, one or more of the access actions can include opening a cabinet, closing a cabinet, unlocking a cabinet, and locking cabinet. As another example, one or more of the actions can include notifying the user that their package has been picked up.

Step 330 may include one or more access actions for a predetermined type of transaction. These transactions may include one or more of the following transactions from the following non-limiting list: cash, credit, debit, other non-cash transactions, point of sale transactions, and other consumer based transactions. It is understood that this list is illustrative and may include other examples of transactions.

Step 330 may include one more access actions for a predetermined time period. For example, the access action may be available for one minute, one hour, or other predetermined time period. After this period elapses, further authentication as described herein may be required to re-perform the access action. Alternatively, if less time is needed for the access action, further authentication as described herein may be required to end the access action prior to the expiration of the predetermined time period.

Step 325 may include one or more actions for authorizing remote access to one or more users. The processor may perform one or more access actions for a smart device, which can include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Figure 3B:
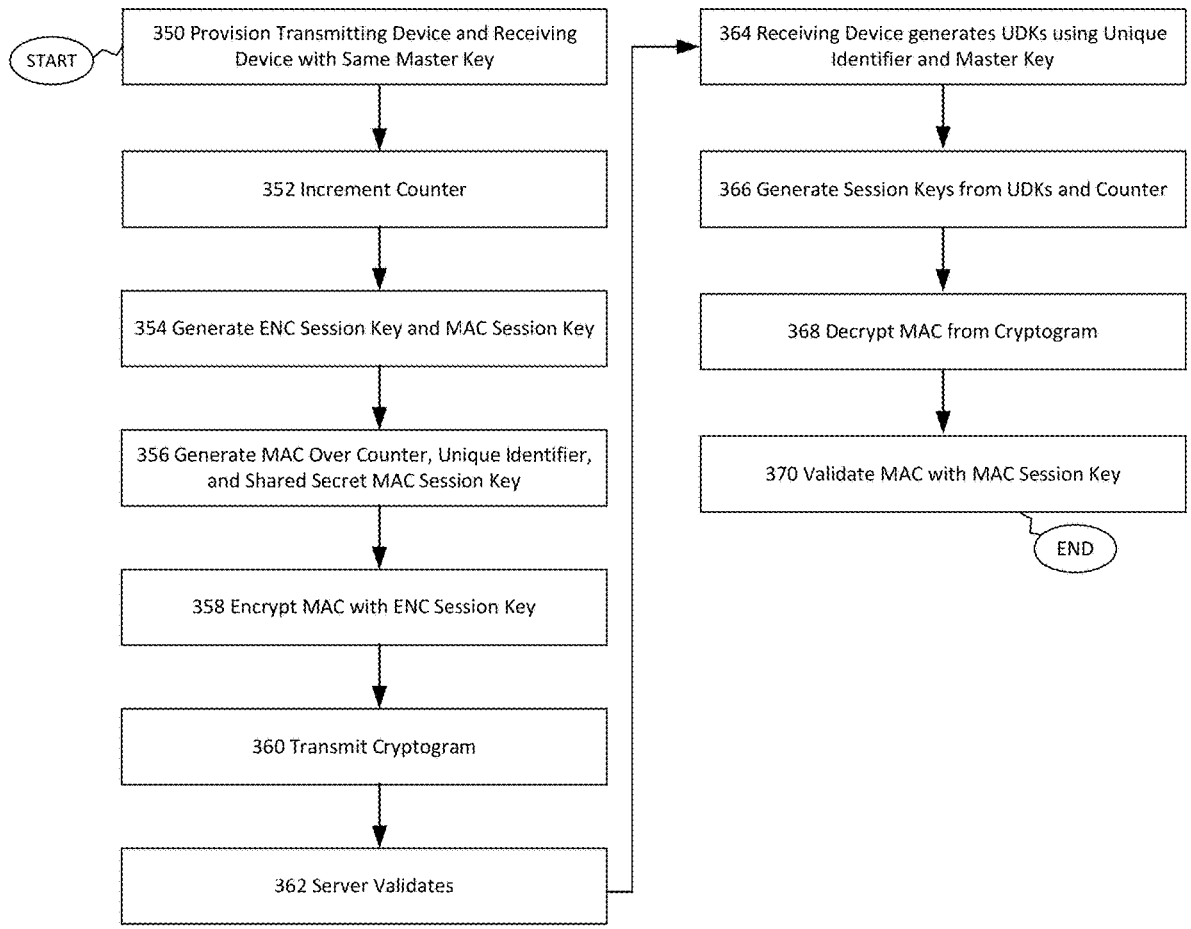
FIG. 3B is a method flow chart illustrating a method of key diversification according to an example embodiment.

FIG. 3B is a flow chart of method 300B of key diversification according to an example of the present disclosure. FIG. 3B can reference the same or similar components as illustrated in FIGS. 1-2.

For example, a sender and recipient may desire to exchange data via a transmitting device (e.g. a user device) and a receiving device (e.g. a storage device and/or a user device). As explained above, it is understood that one or more transmitting devices and one or more receiving devices may be involved so long as each party shares the same shared secret symmetric key. In some examples, the transmitting device and receiving device may be provisioned with the same master symmetric key. In other examples, the transmitting device may be provisioned with a diversified key created using the master key. In some examples, the symmetric key may comprise the shared secret symmetric key which is kept secret from all parties other than the transmitting device and the receiving device involved in exchanging the secure data. It is further understood that part of the data exchanged between the transmitting device and receiving device comprises at least a portion of data which may be referred to as the counter value. The counter value may comprise a number that changes each time data is exchanged between the transmitting device and the receiving device.

The transmitting device and the receiving device may be configured to communicate via NFC, Bluetooth, RFID, Wi-Fi, and/or the like.

The method 300B can begin with Step 350. In step 350, a transmitting device and receiving device may be provisioned with the same master key, such as the same master symmetric key. The transmitting device may be the user device 120. The receiving device may be the contactless card 110. When the transmitting device is preparing to process the sensitive data with symmetric cryptographic operation, the sender may update a counter. In addition, the transmitting device may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128, a symmetric HMAC algorithm, such as HMAC-SHA-256, and a symmetric CMAC algorithm, such as AES-CMAC.

In step 352, the transmitting device may take the selected cryptographic algorithm, and using the master symmetric key, process the counter value 114. For example, the sender may select a symmetric encryption algorithm, and use a counter which updates with every conversation between the transmitting device and the receiving device The one or more counters 114 may comprise a numeric counter sufficient to store an integer. The processor may increment the counter one or more times.

In step 354, the transmitting device generates two session keys: one ENC (encryption) session key and one MAC (message authentication code) session key. The transmitting device may encrypt the counter value with the selected symmetric encryption algorithm using the master symmetric key to create a session key.

In step 356, the processor generates the MAC over the counter 114, the unique customer identifier 115, and the shared secret MAC session key. The customer identifier 115 may comprise a unique alphanumeric identifier assigned to a user of the contactless card 110, and the identifier may distinguish the user of the contactless card from other contactless card users. In some examples, the customer identifier 115 may identify both a customer and an account assigned to that customer and may further identify the contactless card associated with the customer's account.

In step 358, the processor encrypts the MAC with the ENC session key. As encrypted, the MAC can become a cryptogram. In some examples, a cryptographic operation other than encryption may be performed, and a plurality of cryptographic operations may be performed using the diversified symmetric keys prior to transmittal of the protected data.

In some examples, the MAC cryptogram can be a digital signature used to verify user information. Other digital signature algorithms, such as public key asymmetric algorithms, e.g., the Digital Signature Algorithm and the RSA algorithm, or zero knowledge protocols, may be used to perform this verification.

In step 360, the processor transmits a cryptogram to the receiving device. The receiving device can the contactless card 110. The cryptogram can include the applet information 113, the unique customer identifier 115, the counter value 114, and the encrypted MAC.

In step 362, the server validates the cryptogram. The server may be a part of the transmitting device or receiving device. Alternatively, the server may be a separate entity.

In step 364, the receiving device generates its own UDKs (unique diversified keys) using the unique customer identifier 115 and the master key. The unique customer identifier 115 is derived from the validated cryptogram. Recall that the receiving device has already been provisioned with the master key.

In step 366, the receiving device generates two session keys: one ENC (encryption) session key and one MAC (message authentication code) session key. The receiving device may generate these session keys from the UDKs and the counter value 114. The counter value 114 can be derived from the cryptogram.

In step 368, the receiving device uses the session keys to decrypt the MAC from the cryptogram sent by the transmitting device. The output of the encryptions may be the same diversified symmetric key values that were created by the sender. For example, the receiving device may independently create its own copies of the first and second diversified session keys using the counter. Then, the receiving device may decrypt the protected data using the second diversified session key to reveal the output of the MAC created by the transmitting device. The receiving device may then process the resultant data through the MAC operation using the first diversified session key.

In step 370, the receiving device validates the MAC with the MAC session key generated in step 366. The receiving device may validate the MAC over the unique customer identifier 115 and the counter value 114.

Figure 4:
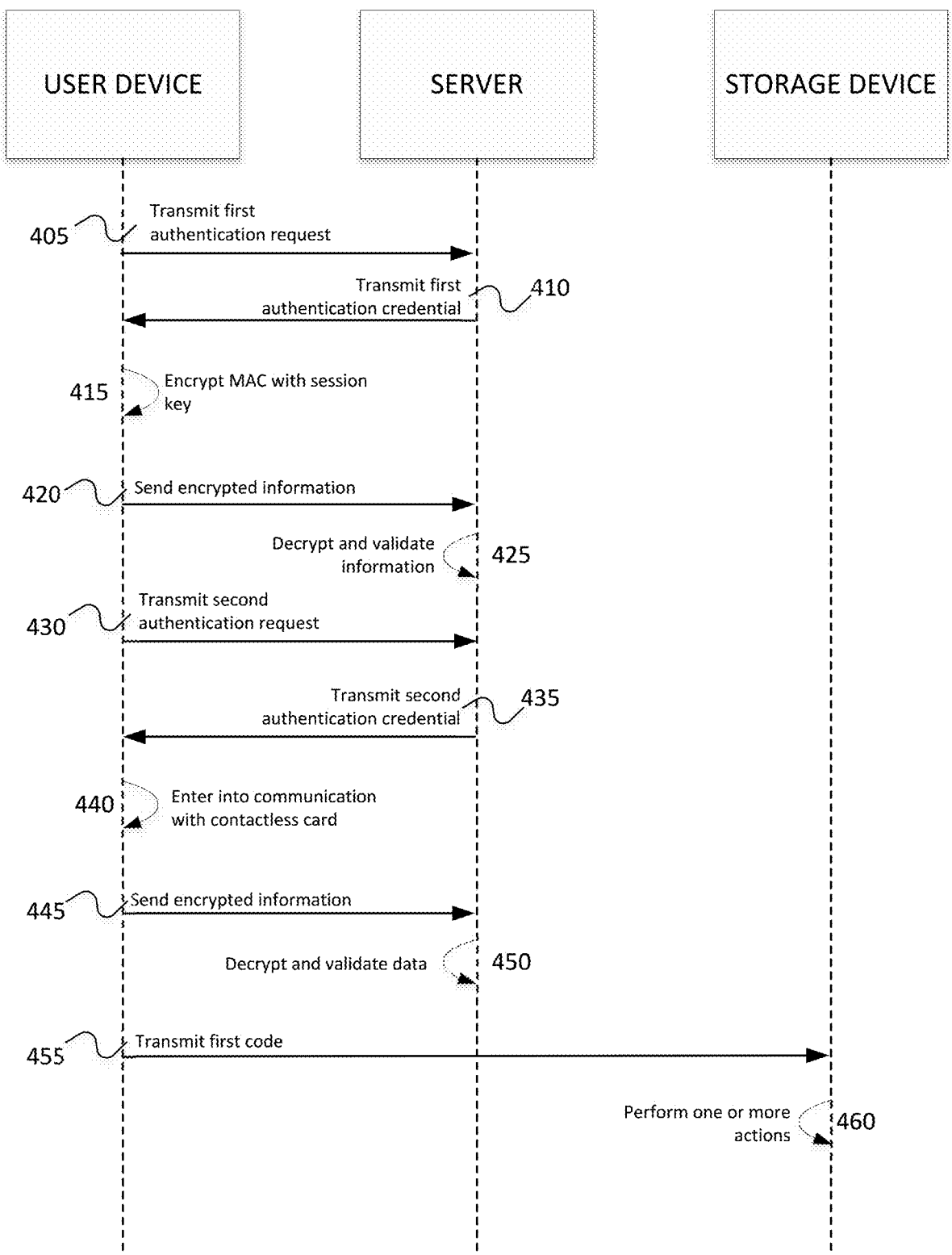
FIG. 4 is a sequence diagram illustrating a method of secure access according to an example embodiment.

FIG. 4 illustrates a sequence diagram 400 of the secure access system. FIG. 4 can reference the same or similar components as illustrated in FIGS. 1-3.

The sequence 400 can commence in step 405 where the transmitting device (e.g., a user device) transmits the first authentication request to the server. The server may be a part of the storage device. It is understood that the transmitting device may be in data communication with the server via one or more intermediary devices, such as one or more user devices.

In step 410, the server transmits the first authentication credential to the transmitting device.

The processor may attempt transmission of the first and second authentication credentials up to a predetermined threshold number. For example, the processor may attempt to send the first authentication credential up to a threshold of five attempts if the first four attempts are not satisfied. It is understood that five is an example threshold, and that the processor may attempt transmission five times, less than five times, or more than five times.

In step 415, the transmitting device encrypts the information or data necessary to satisfy the first authentication credential. The method of encryption is further explained with reference to FIG. 3B. The first authentication credential can be associated with user login data. It is understood that the user login data can include many different kinds of information, such as identification information, financial information, location information, timing information, or some other kind of information.

In step 420, the transmitting device sends the encrypted information to the storage device. The storage device may include the server.

In step 425, the storage device decrypts and validates the information sent by the transmitting device, thereby validating the first authentication necessary to perform an access action.

In step 430, the transmitting device transmits the second authentication request to the server. The server may be a part of the storage device.

In step 435, the server transmits the second authentication credential to the transmitting device.

The processor may attempt transmission of the first and second authentication credentials up to a predetermined threshold number. For example, the processor may attempt to send the first authentication credential up to a threshold of five attempts if the first four attempts are not satisfied. It is understood that five is an example threshold, and that the processor may attempt transmission five times, less than five times, or more than five times.

The processor may delay the performance of one or more access actions if the attempted transmission of the first and second authentication credentials exceed the predetermined threshold.

In step 440, the transmitting device encrypts the data or information necessary to satisfy the second authentication credential. The method of encryption is further explained with reference to FIG. 3B. The second authentication credential may be associated with a contactless card. It is understood that the user login data can include many different kinds of information, such as identification information, financial information, location information, timing information, or some other kind of information.

In step 445, the transmitting device sends the encrypted information to the storage device. The storage device may include the server.

In step 450, the storage device decrypts and validates the information sent by the transmitting device, thereby validating the second authentication necessary to perform an access action.

In step 455, the transmitting device transmits the first code to the storage device. The processor may receive a second code if the first code is not received and inputted within a predetermined time period.

In step 460, the storage device performs one or more actions related to the first code. One or more of the access actions can include opening a safe, closing a safe, unlocking a safe, and locking a safe. As another example, one or more of the access actions can include opening a cabinet, closing a cabinet, unlocking a cabinet, and locking cabinet. As another example, one or more of the actions can include notifying the user that their package has been picked up.

Step 460 may include one or more access actions for a predetermined type of transaction. These transactions may include one or more of the following transactions from the following non-limiting list: cash, credit, debit, other non-cash transactions, point of sale transactions, and other consumer based transactions. It is understood that this list is illustrative and may include other examples of transactions.

Step 460 may include one more access actions for a predetermined time period.

Step 460 may include one or more actions for authorizing remote access to one or more users. The processor may perform one or more access actions for a smart device, which can include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Figure 5:
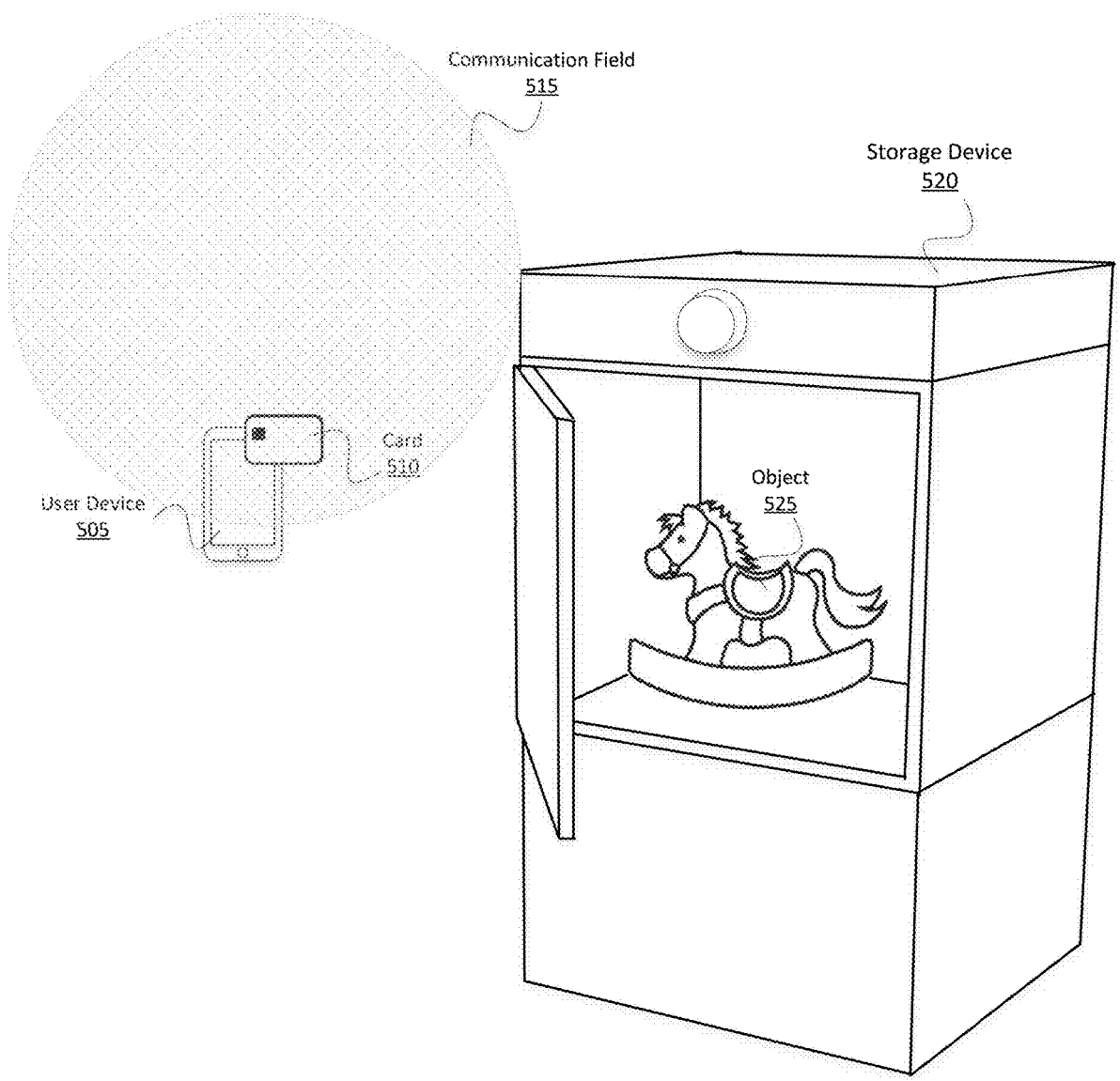
FIG. 5 is a diagram of a secure access system according to an example embodiment.

FIG. 5 illustrates a diagram 500 of the secure access system. FIG. 5 can reference the same or similar components as illustrated in FIGS. 1-4.

The diagram 500 may include a user device 505 which are further explained with reference to FIG. 1. The user login data associated with the user device 505 may serve as a first authentication credential. It is understood that the user login data can include many different kinds of information, such as identification information, financial information, location information, timing information, or some other kind of information.

The user device 505 may interact with a contactless card 510 which is further explained with reference to FIGS. 2A-2B. The information associated with the contactless card 510 may serve as a second authentication credential.

When the user device 505 and contactless card 510 satisfy the authentication requirements, information can be shared through a Bluetooth signal or wireless signal 515.

The user device 505 and contactless card 510 can satisfy the authentication requirements requested by the storage device 520 which is further explained with reference to FIG. 1. The storage device 520 can request, receive, and authenticate information stored on either or both the user device 505 and contactless card 510. Once the storage device 520 has authenticated a sufficient amount of information, it may perform one or more actions. In the diagram 500, the storage device 520 performs an action associated with opening a storage locker with a valuable item inside. It is understood that the storage device 520 may include not only storage lockers, but package lockers, medicine cabinets, delivery boxes, mail boxes, P.O. boxes, safes, or any other container used by consumers to store deliveries or otherwise private items.

The storage device 520 may open to allow the user to retrieve an item 525.

Figure 6:
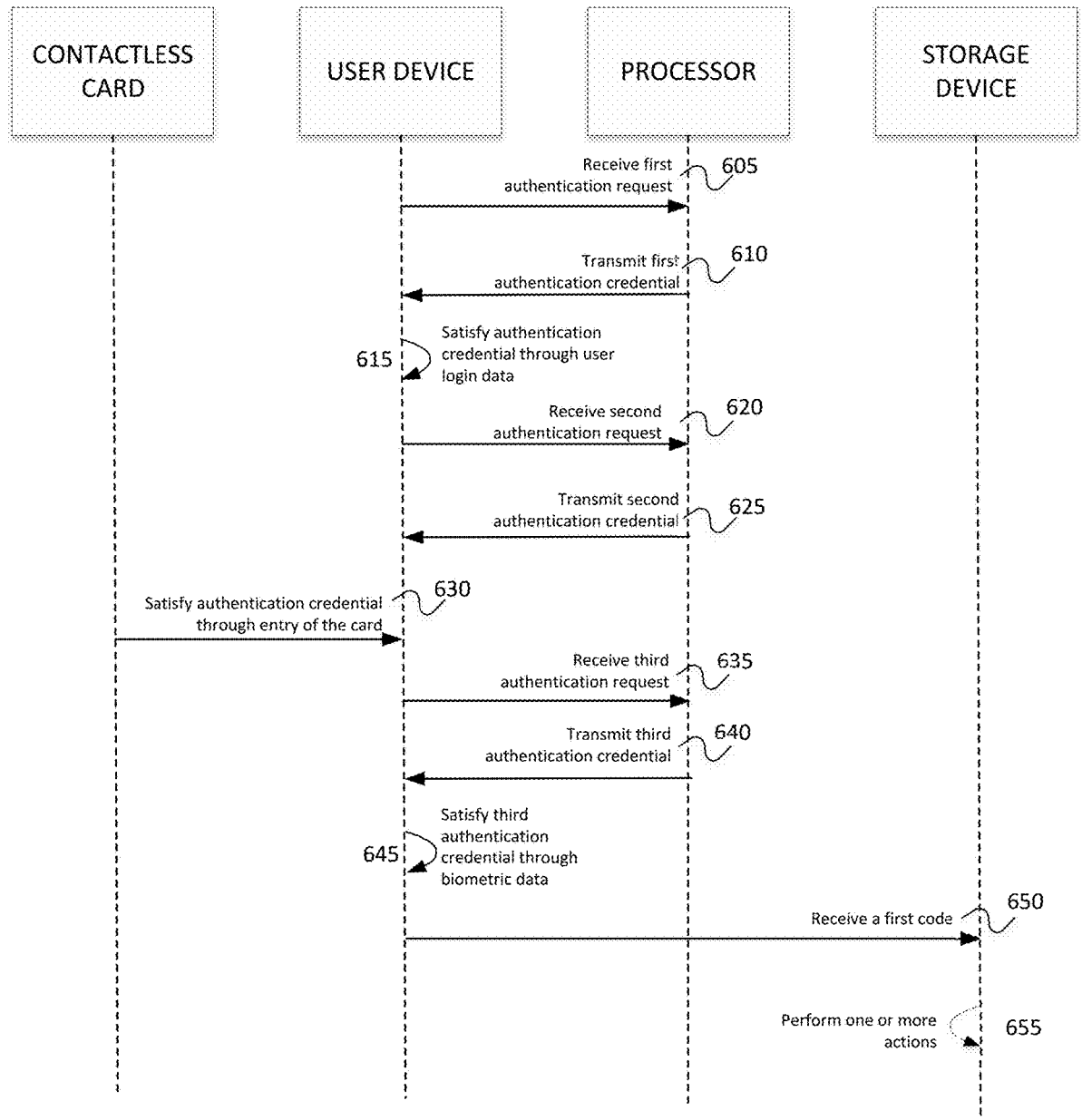
FIG. 6 is a sequence diagram of a secure access system according to an example embodiment.

FIG. 6 illustrates a sequence diagram of a secure access system with the typical authentication credentials of user login data, a contactless card, and biometric data which has not previously been illustrated. FIG. 6 is an exemplary process illustrating secure access to a storage device according to one example. FIG. 6 can reference the same or similar components as illustrated in FIGS. 1-5.

It is understood that the method of encryption with reference to FIG. 3B can apply to the sequence 600.

The sequence 600 describes a sequence of actions between a contactless card, a user device, a processor, and a storage device. Contactless cards are further explained with reference to FIGS. 2A-2B. The user device, processor, and storage device are each further explained with reference to FIG. 1.

The sequence 600 can begin with step 605. In step 605, the processor receives a first authentication request from the user device. The processor may be related to the storage device or some other server.

In step 610, the processor transmits a first authentication credential to the user device.

The processor may attempt transmission of the first and second authentication credentials up to a predetermined threshold number. For example, the processor may attempt to send the first authentication credential up to a threshold of five attempts if the first four attempts are not satisfied. It is understood that five is an example threshold, and that the processor may attempt transmission five times, less than five times, or more than five times.

In step 615, the user device satisfies the authentication credential through user login data on the user device or some other processor. It is understood that the user login data can include many different kinds of information, such as identification information, financial information, location information, timing information, or some other kind of information.

In step 620, the processor receives a second authentication request from the user device. The user device is further explained with reference to FIG. 1.

In step 625, the processor transmits a second authentication credential to the user device. The user device is further explained with reference to FIG. 1.

The processor may attempt transmission of the first and second authentication credentials up to a predetermined threshold number. For example, the processor may attempt to send the first authentication credential up to a threshold of five attempts if the first four attempts are not satisfied. It is understood that five is an example threshold, and that the processor may attempt transmission five times, less than five times, or more than five times.

The processor may delay the performance of one or more access actions if the attempted transmission of the first and second authentication credentials exceed the predetermined threshold.

In step 630, the contactless card and the user device interact to satisfy the second authentication credential.

In step 635, the processor receives a third authentication request from the user device. The user device is further explained with reference to FIG. 1.

In step 640, the processor transmits a third authentication credential to the user device. The user device is further explained with reference to FIG. 1.

In step 645, the user device satisfies the third authentication credential associated with biometric data. This biometric data can include one or more predetermined kinds of data including but not limited to voice recognition, fingerprint scanning, handprint scanning, hand-geometry recognition, ear shape recognition, vein pattern recognition, facial recognition, iris recognition, retina recognition, heart-rate recognition, body temperature recognition, and DNA recognition.

In step 650, the processor receives a first code from the user device. The processor may receive a second code if the first code is not received and inputted within a predetermined time period.

In step 655, the storage device performs one or more actions based on the first code. One or more of the access actions can include opening a safe, closing a safe, unlocking a safe, and locking a safe. As another example, one or more of the access actions can include opening a cabinet, closing a cabinet, unlocking a cabinet, and locking cabinet. As another example, one or more of the actions can include notifying the user that their package has been picked up.

Step 655 may include one or more access actions for a predetermined type of transaction. These transactions may include one or more of the transactions from the following non-limiting list of transactions: cash, credit, debit, other non-cash transactions, point of sale transactions, and other consumer based transactions. It is understood that this list is illustrative and may include other examples of transactions.

Step 655 may include one more access actions for a predetermined time period.

Step 655 may include one or more actions for authorizing remote access to one or more users. The processor may perform one or more access actions for a smart device, which can include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Figure 7:
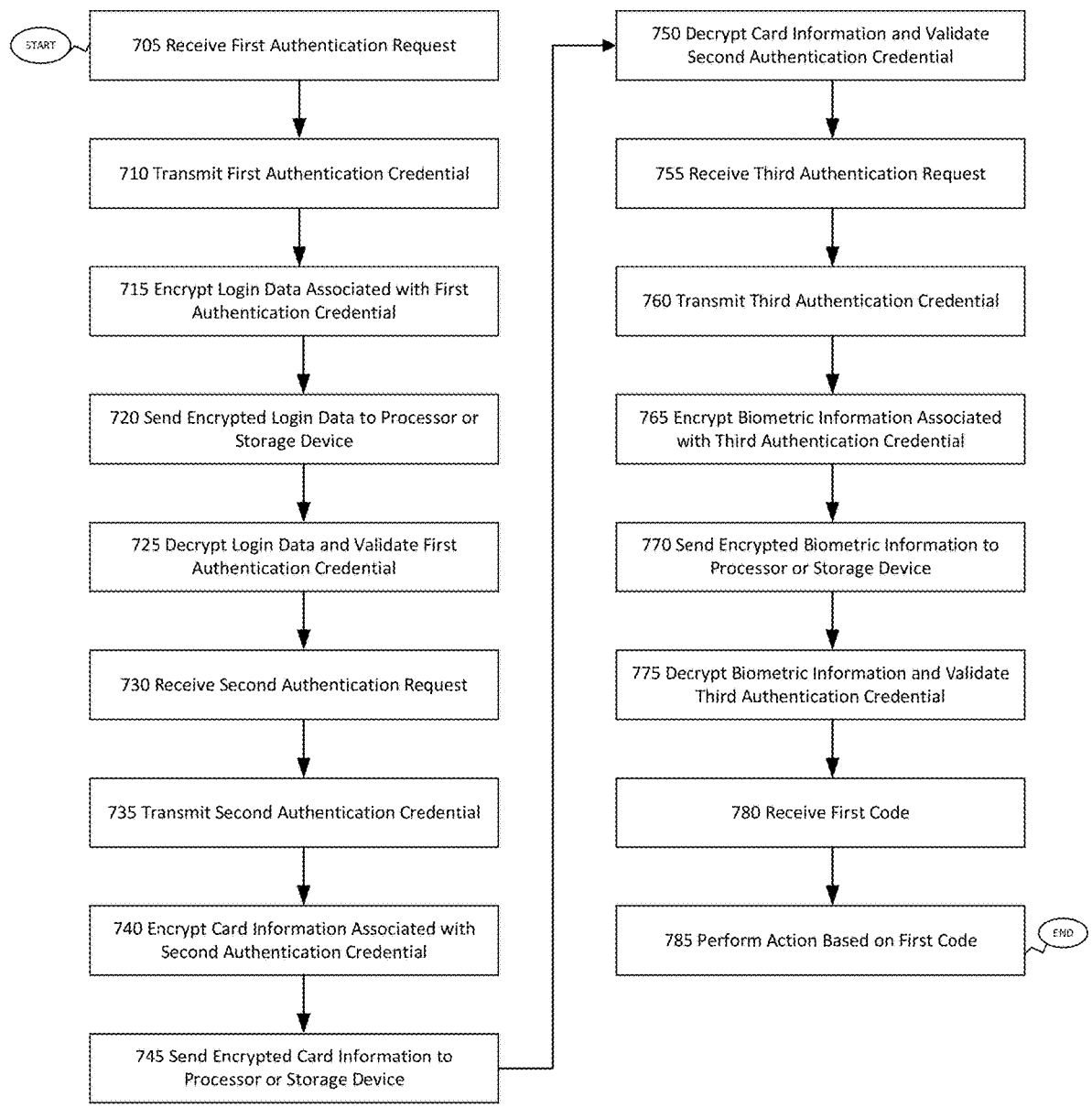
FIG. 7 is a method diagram of a secure access system according to an example embodiment.

FIG. 7 depicts an exemplary process illustrating secure access to a storage device according to one example. FIG. 7 can reference the same or similar components as illustrated in FIGS. 1-6.

The method 700 describes a typical sequence of actions between a contactless card, a user device, a processor, and a storage device. Contactless cards are further explained with reference to FIGS. 2A-2B. The user device, processor, and storage device are each further explained with reference to FIG. 1. The method of encryption is further explained with reference to FIGS. 3B and 4.

The method 700 can being with step 705, in which the processor receives the first authentication request from a user device.

In step 710, the processor transmits a first authentication credential to the user device.

In step 715, the user device encrypts the login data associated with the first authentication credential.

In step 720, user device sends the now encrypted user login data to the storage device or processor.

In step 725, the processor or storage device decrypts the use login data and validates the first authentication credential.

In step 730, the processor receives a second authentication request from the user device.

In step 735, the processor transmits a second authentication credential to the user device.

In step 740, the user device communicates with a contactless card and encrypts the card information associated with the second authentication credential. It is understood that the information shared between the card and the user device can include many different kinds of information, such as identification information, financial information, location information, timing information, or some other kind of information In step 745, the user device sends the encrypted card information to the processor or storage device.

In step 750, the processor or storage device decrypts the card information and validates the second authentication credential.

The processor may attempt transmission of the first and second authentication credentials up to a predetermined threshold number. For example, the processor may attempt to send the first authentication credential up to a threshold of five attempts if the first four attempts are not satisfied. It is understood that five is an example threshold, and that the processor may attempt transmission five times, less than five times, or more than five times.

The processor may delay the performance of one or more access actions if the attempted transmission of the first and second authentication credentials exceed the predetermined threshold.

In step 755, the processor can receive a third authentication request from the user device.

In step 760, the processor can transmit a third authentication credential to the user device.

In step 765, the user device can encrypt a user's biometric information associated with the third authentication credential. This biometric data can include one or more predetermined kinds of data including but not limited to voice recognition, fingerprint scanning, handprint scanning, hand-geometry recognition, ear shape recognition, vein pattern recognition, facial recognition, iris recognition, retina recognition, heart-rate recognition, body temperature recognition, and DNA recognition.

In step 770, the user device sends the encrypted biometric information to the processor or storage device.

In step 775, the processor or storage device decrypts the user biometric information and validates the third authentication credential.

In step 780, a first code is received by either or both the processor or the storage device. The processor may receive a second code if the first code is not received and inputted within a predetermined time period.

In step 785, the storage device performs one or more actions based on the receipt of the first code. One or more of the access actions can include opening a safe, closing a safe, unlocking a safe, and locking a safe. As another example, one or more of the access actions can include opening a cabinet, closing a cabinet, unlocking a cabinet, and locking cabinet. As another example, one or more of the actions can include notifying the user that their package has been picked up.

Step 785 may include one or more access actions for a predetermined type of transaction. These transactions may include one or more of the following transactions from the following non-limiting list: cash, credit, debit, other non-cash transactions, point of sale transactions, and other consumer based transactions. It is understood that this list is illustrative and may include other examples of transactions.

Step 785 may include one more access actions for a predetermined time period.

Step 785 may include one or more actions for authorizing remote access to one or more users. The processor may perform one or more access actions for a smart device, which can include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

It is understood that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A secure access system, comprising:
a memory; and
a processor, wherein the processor is configured to:
receive a first authentication request,
transmit, in response to the first authentication request, a first authentication credential, the first authentication credential associated with user login data,
receive a second authentication request,
transmit, in response to the second authentication request, a second authentication credential, the second authentication credential associated with an entry of a card into a communication field,
receive a first code, and
perform one or more access actions based on the first code.

2. The secure access system of claim 1, wherein the processor is further configured to attempt, by the processor, transmission of the first and second authentication credentials up to a predetermined threshold number.

3. The secure access system of claim 2, wherein the processor is further configured to delay the performance of one or more access actions if the attempted transmission of the first and second authentication credentials exceed the predetermined threshold number.

4. The secure access system of claim 1, wherein the one or more access actions includes at least one selected from the group of opening a safe, closing a safe, unlocking a safe, and locking a safe.

5. The secure access system of claim 1, wherein the processor is further configured to:
receive a third authentication request, and
transmit, in response to the third authentication request, a third authentication credential, the third authentication credential associated with biometric data.

6. The secure access system of claim 1, wherein the processor is further configured to perform the one or more access actions for a predetermined type of transaction.

7. The secure access system of claim 1, wherein the processor is further configured to authorize remote access to one or more users.

8. The secure access system of claim 1, wherein the processor is further configured to perform the one or more access actions for a smart device.

9. The secure access system of claim 1, wherein the processor is further configured to receive a second code if the first code is not received and inputted within a predetermined time period.

10. The secure access system of claim 1, wherein the processor is further configured to perform the one or more access actions for a predetermined time period.

11. A method of secure access system, comprising:
receiving, by a processor, a first authentication request;
transmitting, by the processor in response to the first authentication request, a first authentication credential, the first authentication credential associated with user login data;
receiving, by the processor, a second authentication request;
transmitting, by the processor in response to the second authentication request, a second authentication credential, the second authentication credential associated with an entry of a card into a communication field;
receiving, by the processor, a first code; and
performing, by the processor, one or more access actions based on the first code.

12. The method of claim 11, further comprising attempting, by the processor, a transmission of the first and second authentication credentials up to a predetermined threshold number.

13. The method of claim 12, further comprising delaying, by the processor, a performance of one or more access actions if the attempted transmission of the first and second authentication credentials exceed the predetermined threshold number.

14. The method of claim 11 wherein the one or more access actions includes at least one selected from a group of opening a cabinet, closing a cabinet, unlocking a cabinet, and locking a cabinet.

15. The method of claim 11, further comprising:
receiving, by the processor, a third authentication request, and
transmitting, by the processor in response to the third authentication request, a third authentication credential, the third authentication credential associated with biometric data.

16. The method of claim 15, further comprising performing, by the processor, the one or more access actions for a predetermined type of transaction.

17. The method of claim 16, further comprising authorizing, by the processor, remote access to one or more users.

18. The method of claim 16, further comprising performing, by the processor, the one or more access actions for a smart device.

19. The method of claim 11, further comprising receiving, by the processor, a second code if the first code is not received and inputted within a predetermined time period.

20. A computer readable non-transitory medium comprising computer executable instructions that, when executed on a processor, perform procedures comprising the steps of:

receiving a first authentication request;

transmitting, in response to the first authentication request, a first authentication credential, the first authentication credential associated with user login data;

receiving, a second authentication request; and transmitting, in response to the second authentication request, a second authentication credential, the second authentication credential associated with an entry of a card into a communication field;

receiving a code; and performing one or more access actions based on the code.

* * * * *